Oct. 13, 1964           E. W. PEARSON           3,152,503
CONTROL SYSTEM FOR HOLD DOWN MEANS IN A SHEAR OR LIKE MACHINE
Original Filed Dec. 24, 1957           5 Sheets-Sheet 1

INVENTOR.
EUGENE W. PEARSON
BY
Bruce & Brosler
HIS ATTORNEYS

INVENTOR.
EUGENE W. PEARSON
BY
Bruce & Brosler
HIS ATTORNEYS

Oct. 13, 1964     E. W. PEARSON     3,152,503
CONTROL SYSTEM FOR HOLD DOWN MEANS IN A SHEAR OR LIKE MACHINE
Original Filed Dec. 24, 1957     5 Sheets-Sheet 3
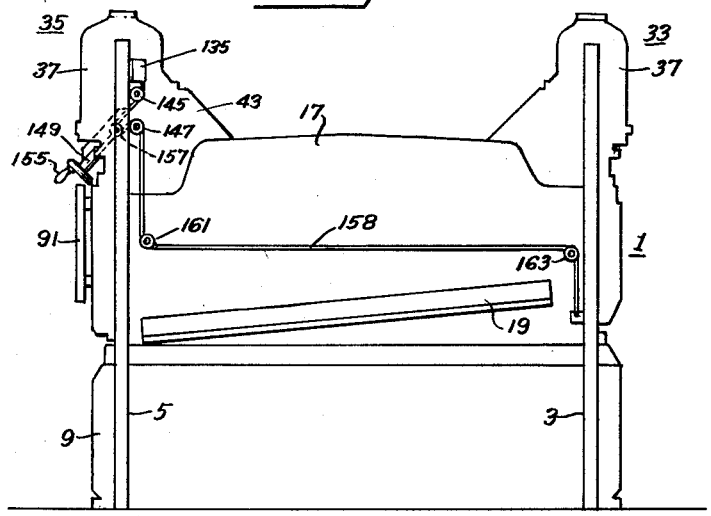
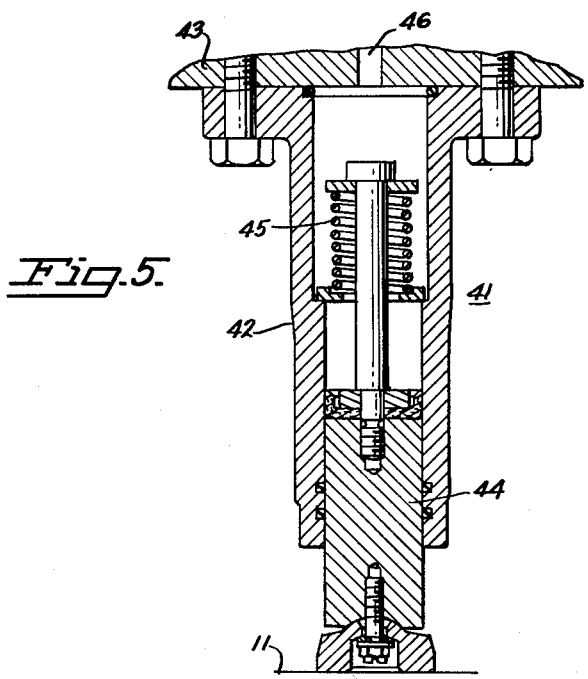
INVENTOR.
EUGENE W. PEARSON
BY
Bruce & Brosler
HIS ATTORNEYS

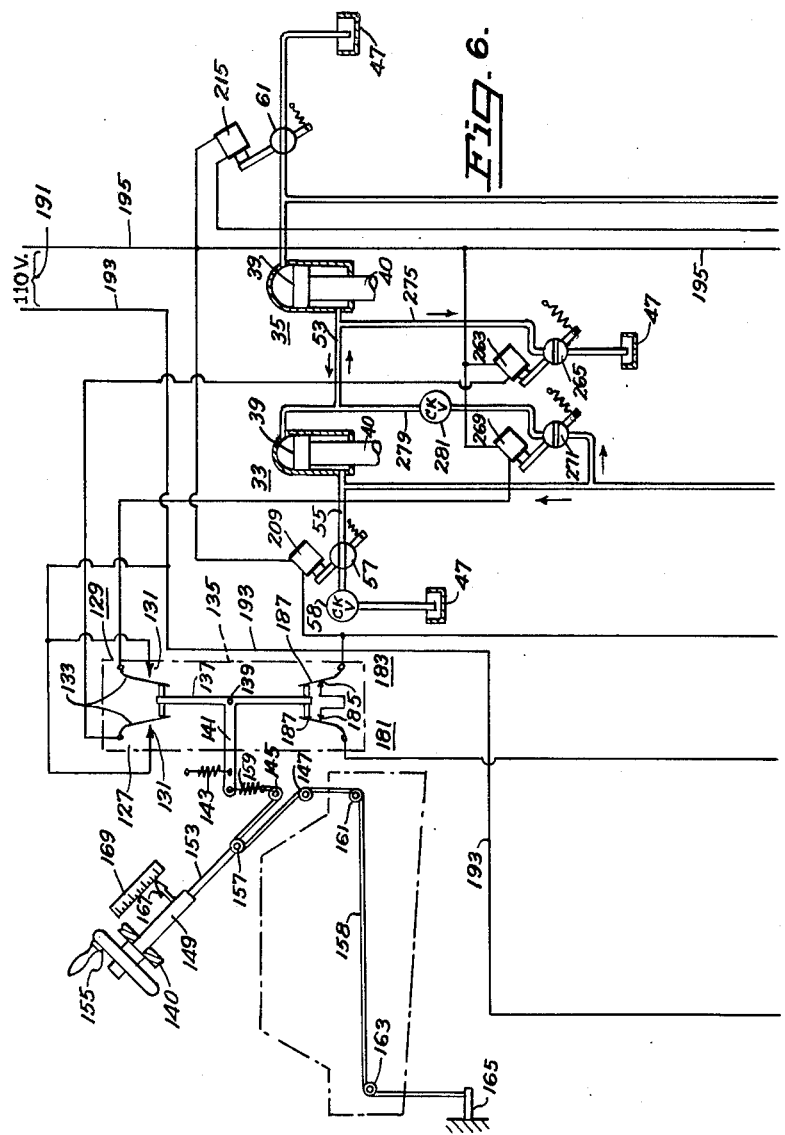

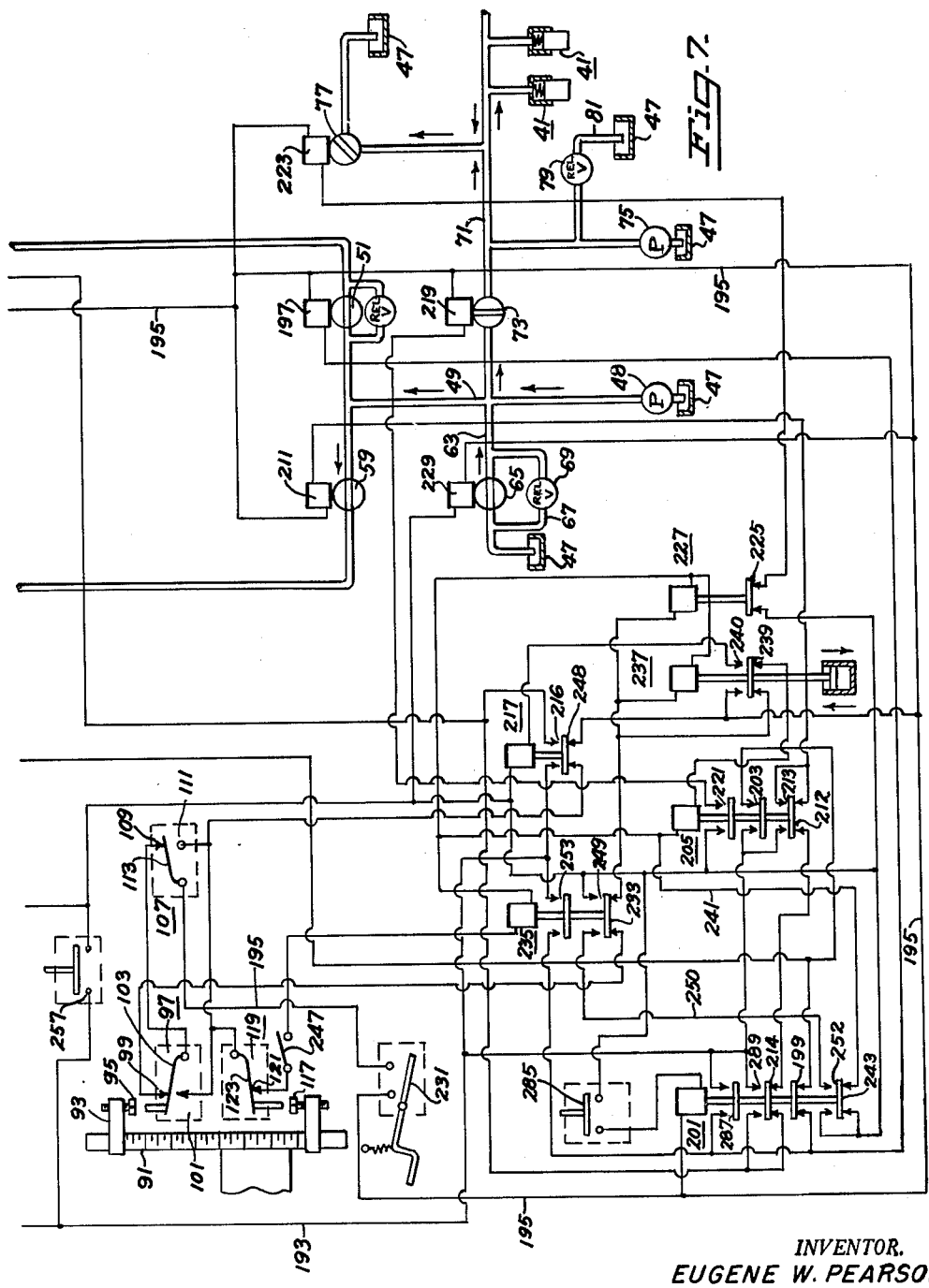

United States Patent Office
3,152,503
Patented Oct. 13, 1964

3,152,503
CONTROL SYSTEM FOR HOLD DOWN MEANS IN A SHEAR OR LIKE MACHINE
Eugene W. Pearson, Orinda, Calif., assignor to Pacific Industrial Manufacturing Co., a corporation of California
Original application Dec. 24, 1957, Ser. No. 704,923. Divided and this application Nov. 14, 1960, Ser. No. 69,010
4 Claims. (Cl. 83—390)

My invention relates to a shear or like machine, and more particularly to a control system for the hold down means of such machine.

This application is a division of my pending application for Shear Machine With Adjustable Ram, Serial No. 704,923, filed December 24, 1957, now abandoned, but refiled as a continuation application on August 5, 1963, under Serial No. 301,696.

Among the objects of my invention are:

(1) To provide a novel and improved shear machine or the like;

(2) To provide a novel and improved control system for the hold down means of a shear machine or the like; and (3) To provide a novel and improved hydraulic control system for the hold down means of a shear machine or the like.

Additional objects of my invention will be brought out in the following description of a preferred embodiment of the same taken in conjunction with the accompanying drawings, wherein FIGURE 1 is a front view in elevation of a shear machine embodying the present invention;

FIGURE 4 is a general view in rear elevation of the machine of FIGURE 1 and depicting features of the invention;

FIGURE 5 is a view in section taken through one of the hold down devices embodied in the machine of FIGURE 1;

FIGURES 6 and 7 are a combined electrical and hydraulic system embodied in the machine of FIGURE 1 and involving pertinent aspects of the present invention.

Figure 1:
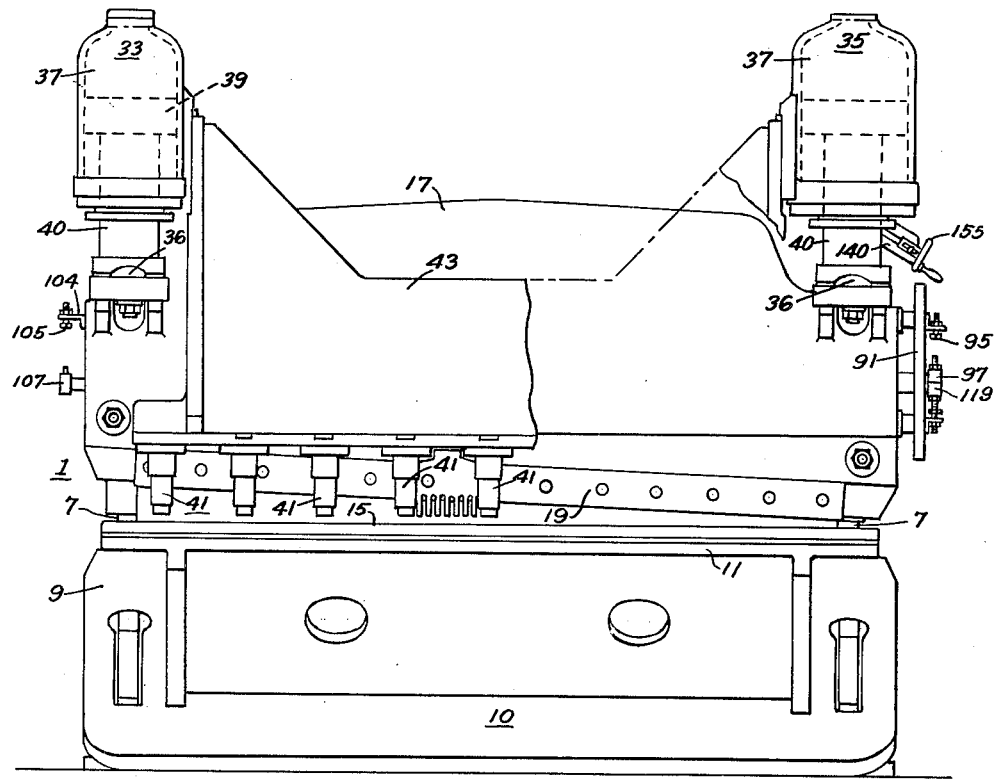
Figure 3:
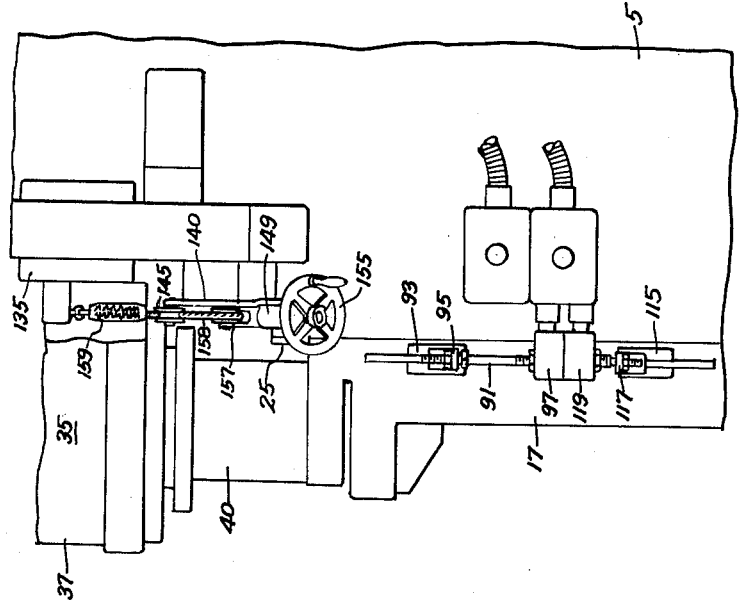
FIGURE 3 is a view in end elevation of the structure of FIGURE 2.
Figure 2:
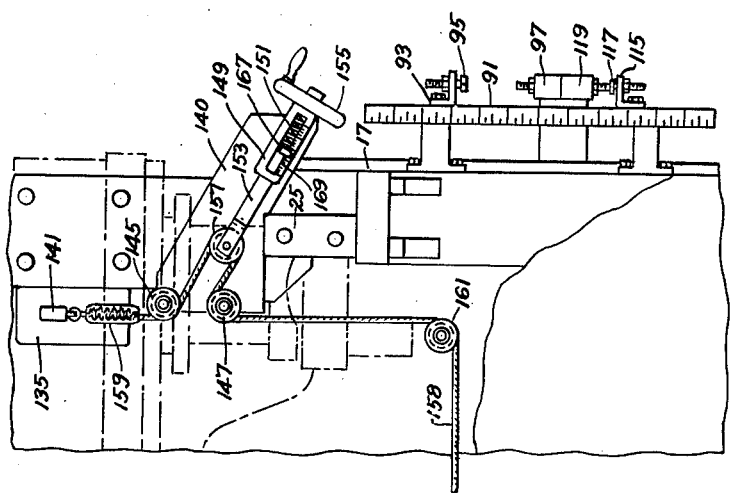
FIGURE 2 is an enlarged fragmentary view of the right hand end of the machine of FIGURE 1.

Referring to the drawings for details of my invention in its preferred form, the same is shown incorporated in a hydraulically powered shear machine comprising a frame 1 involving a pair of spaced side walls 3 and 5, each formed with a relatively deep throat 7 in the front edge thereof.

Spanning the side walls, along the front edges thereof below the throats, is a front wall 9 constituting a component of a work table assembly 10 in which the table 11 extends outwardly from the front wall along its upper edge. At the junction of the front wall and table, the assembly is recessed to receive a stationary knife 15. Such assembly and manner of mounting the same constitute the subject of my application for Knife Adjustment for Shear Machine, Serial No. 528,396, filed Aug. 15, 1955.

The front edge portion of the side walls above the throats are set back somewhat to permit of supporting a ram 17 which carries the upper knife or shear blade 19 of the machine in proper relationship to the fixed or stationary knife 15.

For the purpose of mounting the ram for movement, a pair of ways 25 are affixed to the upper front edges of the side walls, and the ram is slidably maintained in engagement with such ways.

The operating movements of the ram are controlled hydraulically in the machine under consideration by a hydraulic system including a left cylinder assembly 33 and a right cylinder assembly 35 affixed to the upper front edges of the side walls of the machine housing and coupled to the ram by a pivotal connection 36 such as provided by a ball and socket joint. Thus each end of the ram will be powered by one of the cylinder assemblies, which includes a cylinder 37 and included piston 39, the cylinder being fixed to the proximate side wall of the machine and its piston connected by a piston rod 40 to the ram through its associated pivotal connection.

The work to be sheared is held to the work table by a plurality of hold down devices 41, each involving a cylinder 42 suspended from a beam 43 which is rigidly fixed between the two cylinders 37. Included in each cylinder 42 is a piston 44 supported from a compression spring 45 which normally retracts the piston into its cylinder. A flow passage 46 into the cylinder enables the piston to be hydraulically driven outwardly against the restoring action of the spring.

Hydraulic energy for a work stroke of the ram is applied from a tank 47 by a main pump 48 through a main line 49 and by way of a "down" valve 51 to the upper end of the right hand cylinder assembly 35, which in turn is hydraulically connected in series with the other cylinder assembly 33 by a connecting line 53 from a point below the piston of the cylinder assembly 33. The circuit is completed by a return line 55 from the lower end of the cylinder of the latter assembly 33, through a foot valve 57 and check valve 58, back to the tank from which the main pump derives its liquid. The check valve creates sufficient back pressure to support the ram in its uppermost position.

The "down" valve 51 is a solenoid operated valve which is normally open when not energized, and the foot valve 57 is similar in nature, in that it also is a solenoid operated valve which is normally open when not energized.

The cylinder assemblies are thus operated in series, and to assure equal rate of travel of both pistons, all other factors being favorable, the cylinder assembly 35 is so designed that the under surface of its piston equals in area the upper surface of the piston in the second cylinder assembly 33.

For upward or return movement of the ram, the output of the main pump is caused to flow in a reverse direction through the cylinder assemblies, the flow of liquid being through an "up" valve 59 to the underside of the smaller piston of the cylinder assembly 33 and from the upper end of the larger cylinder assembly 35 through an operating dump valve 61 and back to the supply tanks. Both the "up" valve 59 and the operating dump valve 61 are similar to previously described valves 51 and 57 in being solenoid operated and normally open when not energized.

For emergency use, a direct line connection 63 back to the supply tank 47 from the main line 49 of the pump is provided through an emergency stop valve 65, which is also of the solenoid operated type, this valve, like the others previously discussed, being normally open when not energized.

A by-pass 67 around this emergency stop valve, includes a relief check valve 69 and will serve to safeguard the system against the building up of excessive pressures as measured by the setting of this check valve.

The hold down devices 41 are initially actuated into engagement with the work in preparation for a down stroke of the ram, from the main pump 48 through a line connection 71 including a hold down advance valve 73 which like the others, is of the solenoid type, but differs in that it is a normally closed valve when not energized.

Following contact with the work, the duty of holding the hold down device in pressure engagement with the work is then relegated to a hold down pump 75 which derives its fluid from the same supply source 47 and feeds it into the same line connection 71 leading to the hold down devices. A release circuit back to the supply tank from the same line 71 which feeds the hold down devices, including a solenoid operated hold down release valve 77 which is normally closed when not energized. With this release line blocked by the valve 77 in its closed condition, the pumping of liquid to the hold down devices and subsequent application of hold down pressure is permitted, but with the valve energized to its open position, each of the hold down pistons is then free to be restored to its up position out of contact with the work. Such release circuit will also provide an open line to the supply tank 47 for liquid pumped by the hold down pump 75, or the main pump 48 should the hold down advance valve 73, for any reason, be open at the same time that the hold down release valve is open.

Like with the main pump, the hold down pump is provided with a relief valve 79 in a return line 81 back to the supply tank, whereby to protect the hold down pump system against building up of excessive pressures determined by the setting of its associated relief valve 79.

All of the aforementioned solenoid operated valves tie in with the operation of the shear machine and are interlinked therewith by means of electrical circuits to assure operation in the manner indicated.

In this connection, the machine is provided with depth stop means for determining the lower limit of travel of the ram, this involving a vertical scale 91 affixed to an edge of the ram 17 and carrying a bracket 93 at its upper end in which is adjustably mounted a switch actuating stop 95.

Affixed to a stationary portion of the machine such as the side wall 5 and in the line of travel of the stop 95, is a micro-switch 97 having upper and lower spaced apart contacts 99, 101 with a spring armature 103 between and normally engaging the upper contact. This switch is so located as to be actuated by the stop 95 when the ram reaches its lower limit of intended travel. The aforementioned depth stop means is mounted at that end of the machine at which the lower end of the angularly mounted shear blade is located.

The bracket 93 which carries the depth stop 95 is preferably adjustably mounted on the scale whereby to control the length of down stroke of the ram and thus alter the lower limit of travel of the blade. The adjustability of the stop 95 permits of determining the stroke length with precision.

At the opposite end of the machine, there is also mounted a depth stop involving a bracket 104 fixedly mounted on the ram and carrying an adjustable stop 105. In line with movement of this stop, is a micro-switch 107 similar to the other in that it involves an upper contact 109 and a lower contact 111 spaced therefrom, with a spring armature 113 therebetween and normally engaging the upper contact.

Unlike the previous depth stop means, however, the latter is fixed as to the location of its bracket 103 and micro-switch 107, the locations of which are determined so as to permit maximum travel of the piston in the cylinder assembly 33 at that end of the machine, without permitting the piston to bottom in its cylinder. This depth stop arrangement, accordingly, is a safety feature and normally does not determine the length of the stroke of the ram.

The upper limit of travel of the ram, as is also its upper rest position, is determined by a back travel stop assembly. This involves a bracket 115 mounted on the scale 91 toward its lower end and carrying an upwardly facing adjustable stop 117. Mounted on a fixed portion of the machine, such as the side wall 5, and in line of travel of the stop 117, is a micro-switch 119 having a single contact 121 and a spring armature 123 normally in engagement with such contact but adapted to be disengaged by the back travel stop 117 to open such switch when the ram reaches its upper limit of travel.

The foregoing micro-switches in conjunction with the associated stops serve as means for controlling vertical movements of the ram. The present invention, however, contemplates control of angular adjustments of the ram as well, in order to control the rake or shear blade angle.

Toward this end, a pair of micro-switches 127, 129, each of the normally open type and provided with a single contact 131 and a spring armature 133, are mounted in spaced opposing relationship to each other on a fixed portion of the machine housing, preferably in a housing 135 affixed alongside the right hand cylinder assembly 35. A bar 137 having one end located midway between the armatures of these opposed switches, is pivoted at an intermediate point 139 thereon whereby pivotal movement of the bar may cause the aforesaid end thereof to engage and close one or the other of the micro-switches associated therewith.

Extending from the pivotal point normal to the bar, is a lever 141 which adjacent its free end is anchored to the housing by a spring 143.

Below the right hand cylinder assembly 35 and extending across the front edge of the proximate side wall 5 of the machine housing, to a point just below the housing 135, is a bracket 140. At vertically spaced points on this bracket and in substantial alignment wtih the free end of the lever 141, are mounted a pair of sheaves 145, 147, while at the opposite end of the bracket, there is affixed cylindrical housing 149 having a longitudinal slot 151 in the wall thereof.

This housing slidably receives an adjusting screw 153 which at one end is adapted to threadedly receive an adjusting wheel 155, while its other end is forked to mount a floating sheave 157. A cable 158 affixed to one end of a spring 159 which is suspended from the free end of the lever 141, is passed around the upper sheave 145, then around the floating sheave 157 and over the lower sheave 147. The cable is then wrapped around a sheave 161 mounted on the back of the ram at the proximate end thereof, and carried over a similar sheave 163 mounted on the back of the ram at its opposite end, and from there the cable is anchored to a fixed point 165 on the proximate side wall 3 of the machine. The spring 159 is a stiff spring which protects the cable against development of excessive tension under abnormal conditions.

An indicator 167 affixed to the adjusting screw 153 and extending out through the slot 151 in the housing, is adapted to traverse a scale 169 affixed to or inscribed on the wall of the housing.

With the ram 17 level and the shear blade 19 affixed thereto at a normal angle midway between the upper and lower maximum limits of angular adjustment, and with the spring 143 adjusted to position the micro-switch actuating bar 137 to a neutral position intermediate the opposing micro-switches 127 and 129, and with the indicator 167 about at the mid-point of the scale, it follows that by adjusting the hand wheel in one direction, the micro-switch actuating bar 137 may be rotated in one direction, while for rotation of the hand wheel in the opposite direction from its neutral position, the actuating bar will move in the direction of closing the other switch. These micro-switches, as will be described, serve in controlling the extent to which the ram can be made to tilt in one direction or the other to bring about the necessary angular adjustment of the shear blade attached thereto.

Associated with the lower end of the micro-switch actuating bar 137 are another pair of opposed micro-switches 181, 183, these micro-switches, however, being of the normally closed type and involving each a single contact 185 and a spring armature 187 in contact therewith. The spacing of these latter micro-switches from the end of the actuating bar, however, is such that the normally open switches 127, 129 will be engaged first. In other words, a greater swing of the actuating bar will be necessary to open either of the normally closed micro-switches 181, 183 than is required to close the normally open micro-switches 127, 129 first described.

The normally closed switches constitute emergency stop limit switches adapted to be opened in response to excessive tilting of the ram beyond a point considered safe for the machine, and in response to such tilting, will remove hydraulic power from the machine and cause a complete shutdown thereof.

Operation of the machine is controlled electrically from a power source 191 through a pair of main leads 193, 195.

The "down" valve 51 has a solenoid 197, one terminal of which is connected directly to one of the main leads 195, while the other terminal is connected through the normally closed contacts 199 of a control relay 201 and the normally open contacts 203 of a second control relay 205 to the other of the main leads 193, whereby upon energization of the second control relay 205, the "down" valve will become energized to closed condition.

The foot valve 57 includes a solenoid 209, one terminal of which is also connected directly to one of the main leads 195, while the other terminal is connected through the same normally open contacts 203 of the second control relay 205 to the other main lead 193. The foot valve, therefore, will become energized to closed condition through closure of the same normally open contacts of the second control relay 205, thus blocking flow through this circuit while this second control relay is energized. By the same token, when the second control relay is de-energized, both the "down" valve 51 and the foot valve 57 will be open, thus setting up the hydraulic circuit for a down stroke of the ram.

The "up" valve 59 has a solenoid 211, one terminal of which is connected directly to one of the main leads 195 while the other terminal is connected through normally open contacts 213 of the second control relay 205 to the other main lead 193 thus energizing the "up" valve to closed condition when this second control relay is energized.

The "up" valve 59 may also have its solenoid energized through completion of a circuit through normally closed contacts 212 of the second control relay 205, the normally closed contacts 214 of the first control relay 201, the normally open contacts 216 of a "down" relay 217, to the main lead 193.

The operating dump valve 61 includes a solenoid 215 having one terminal connected directly to one of the main leads 195 while the other terminal is connectible through normally open contacts 216 of the "down" relay 217 to the other main lead 193, whereby upon energization of this "down" relay 217, the operating dump valve will be energized to a closed condition.

The hold down advance valve 73 which is normally closed when not energized, includes an associated solenoid 219, one terminal of which is connected direct to one of the main leads 195, while the other terminal is connectible through normally open contacts 221 of the second control relay 205 and the emergency stop limit switches 181, 183 which are connected in series to the other main lead 193 whereby, upon energization of the second control relay 205, the hold down advance valve 73 will be energized to its open condition.

With respect to the hold down release valve 77, its solenoid 223 has one terminal connected to one of the main leads 195 while its other terminal is connected through the normally closed contacts 225 of a third control relay 227 and the series connected emergency stop limit switches 181, 183 to the remaining main lead 193. Thus the hold down release valve 77 which is normally energized to its open condition, will upon energization of the third control relay 227, be restored to its closed condition.

The emergency stop valve 65 has one terminal of its solenoid 229 connected directly to one of the leads 195 while the other terminal is connected through the series connected emergency stop limit switches 181, 183 to the other main lead 193. Thus this valve will remain energized to its closed condition so long as no emergency arises which will cause either of the emergency stop limit switches to open and break the circuit to the solenoid 229 of the emergency stop valve, whereupon it will open and cause the main pump to idle, thus depriving the machine of hydraulic power to operate the same.

A work or down stroke of the machine is initiated through actuation of a foot switch 231 connected in a circuit leading from one of the main leads 195 through the foot switch to the left hand depth limit switch 107, then to the right hand depth limit switch 97, through the normally closed contacts 233 of an "up" relay 235, through either of three branch leads, one branch connecting to the third control relay 227, the second branch connecting to a time delay relay 237, while the third branch is connected through the normally closed contacts 239 of the time delay relay to the second control relay 205. The three relays 227, 237 and 205 are all connected in parallel to a common lead 241 extending through normally closed contacts 243 of the first control relay 201, the foot switch circuit then extending through the series connected emergency stop limit switches 181, 183 to the other main lead 193.

Thus upon closing of the foot switch 231, the third control relay 227 being energized, immediately opens its contacts 225 which lie in the circuit of the hold down release valve 77, which valve thereupon closes.

The second control relay 205 being energized, immediately causes all its contacts to shift, thus closing the circuit through the "down" valve 51 and through the "up" valve 59, simultaneously causing both of these valves to close. At the same time, closing of the contacts 221 of the second control relay 205 energizes the hold down advance valve 73 to its open condition. The aforementioned conditions are but temporary however to permit of the advance operation of the hold down devices.

At this point in the operation of the system, the hold down release valve 77, the "down" valve 51, and the "up" valve are all closed, while the hold down advance valve 73 is open, thus causing the main pump 48 to pump liquid to the hold down devices 41 and drive them downwardly toward the work. This situation prevails only so long as the time delay relay 237 delays opening of its normally closed contacts 239 for the opening of such contacts will open the circuit to the second control relay 205 which in turn determines the conditions of the "down" valve 51, the "up" valve 59, and the hold down advance valve 73 at this stage in the operation of the machine.

The timing of the time delay relay is adjusted to conform to the time required to bring the hold down means into engagement with the work on the table of the machine. Upon shifting of its contacts, the normally closed contacts 239 of the time delay relay open the circuit to the second control relay 205 and at the same time close associated contacts 240 to complete a circuit through the "down" relay 217, which circuit includes the series connected emergency stop limit switches 181, 183.

Upon energization of the "down" relay, normally open contacts 216 associated therewith, are closed to complete a circuit through the solenoid 215 of the operating dump valve 61 and the solenoid 211 of the "up" valve 59. This closes both valves and blocks flow of liquid therethrough. In conjunction with this, the simultaneous de-energization of the hold down advance valve 73 to its closed condition, brought about by the de-energizing of the second control relay 205, sets up the hydraulic circuit including the "down" valve and the foot valve, for initiating a "down" stroke of the ram.

The closing of the hold down advance valve 73 has the further effect of shifting the full load of the hold down devices 41 to the hold down pump 75 which in turn is free to build up a hold down pressure limited only by the setting of the relief valve 79 in the by-pass circuit around this hold down pump. It is noted in this connection, that the hold down release valve 77, due to continued energization of the third control relay 227 during the down stroke of the ram, remains de-energized and consequently is closed, so that the output of the hold down pump 75 must go to the hold down devices.

When the full down stroke of the ram has been realized, as determined by the setting of the depth stop 95, the right hand depth limit switch 97 is actuated to shift its armature 103 out of engagement with the upper contact 99 and into engagement with the lower contact 101 to establish new circuit conditions, the nature of which depends upon the open or closed condition of an inch switch 247.

First of all, opening of the depth limit switch contacts 99–103 de-energizes the time delay relay 237 which drops out quickly to open the circuit through the "down" relay 217 to close a pair of normally closed contacts 248 associated therewith.

The inch switch is connected in a circuit extending from the main lead 195 through the normally closed contacts 248 of the "down" relay, through the closed back travel limit switch 119, then through the inch switch to one terminal of the "up" relay 235, the other terminal of which is connected through normally closed contacts 243 of the first control relay 201 and the series connected emergency stop limit switches 181, 183 to the other main lead 193. With the inch switch 247 in open condition, the "up" relay cannot be energized and the ram will remain stationary at the end of its down stroke.

With the inch switch closed, however, the "up" relay 235 will become energized and close normally open contacts 249 associated therewith but nothing happens as the lead 250 from one of said contacts connects with one of normally open contacts 252 of the relay 201. A second set of normally open contacts 253 of the "up" relay, will close however, to complete a circuit from the main lead 193 through these now closed contacts 253 of the "up" relay and the normally closed contacts 199 of the first control relay 201, and then through the solenoid 209 of the foot valve 57 to energize this valve to its closed condition.

At the same time, a circuit through the same contacts 253 of the "up" relay is completed through the "down" valve without going through the normally closed contacts 199 of the first control relay, the closing of this circuit serving to energize the "down" valve to a closed condition.

Thus flow of liquid through the "down" valve 51 and the foot valve 57 is now blocked when the "up" relay is energized.

With these two valve thus closed, and with the "up" valve 59 and the operating dump valve 61 un-energized and therefore in open condition, a hydraulic circuit is set up from the main pump 48 through the "up" valve 59, the cylinder assemblies 33, 35 in series, and the operating dump valve 61 to effect a lifting of the ram or return stroke thereof, toward its upper rest position.

In the meantime, the de-energization of the time delay relay 237 by energization of the "up" relay, serves to reset its contacts to their previous normal condition, while the de-energization of the third control relay 227 permits its contacts to again close and place the hold down release valve 77 in circuit to energize the same to its open condition. Thus during the up or return stroke of the ram, the hold down pump 75 and the hold down devices 41 are connected to the supply tank through the hold down release valve 77, thus permitting the springs 45 within the hold down devices to retract the associated pistons from the work and force the contained liquid therefrom back to the supply tank.

Upon reaching the upper limit of its return stroke, the back travel limit stop 117 will engage and open the back travel switch 119. This effectively opens the circuit through the "up" relay thereby de-energizing the same and permitting its contacts to re-establish themselves to their normal positions. The re-opening of the contacts of the "up" relay thus results in de-energizing the "up" valve 59 and the operating dump valve 61 to again block flow of liquid therethrough.

During the up stroke, in the meantime, the resulting removal of the depth stop 95 from engagement with the right hand depth limit switch 97 permits the armature 103 of the switch to again engage the upper contact 99 thereof to reestablish circuit conditions in preparation for another down stroke. As long as the foot switch is held in its closed position, the ram will be caused to cycle down and up and can be brought to rest at any time during a down stroke merely by releasing the foot switch.

In the event during operation of the machine, hydraulic power is cut off through actuation of one of the emergency switches 181 or 183, a normally open reset button 257 in a shunt circuit across said switches may be depressed to manually re-establish operating conditions.

Referring back to the micro-switches 127 and 129, the contacts of these switches are connected in parallel to the main lead 193, while the armature of the micro-switch 127 is connected through the solenoid 263 of a normally closed solenoid controlled valve 265 to the other main lead 195, and the armature of the other micro-switch 129 is connected through the solenoid 269 of another normally closed solenoid controlled valve 271 to the main lead 195.

The first of these two solenoid controlled valves is included in a flow line 275 connecting line 53 to the supply tank 47. This line 275 serves to by-pass the right hand cylinder assembly 35, when liquid is being pumped through the "up" valve 59 to the under side of the piston in the cylinder assembly 33. Under these conditions, it will be apparent that the left hand end of the ram is being lifted while the right hand end does not change elevation. The ram, therefore, will be caused to pivot about the ball and socket connection at the right hand end thereof. Inasmuch as the lower end of the upper blade 19 is located below the ball and socket connection at the end of the ram, its elevational position would hardly be affected by such pivoting, and the ram may be said to tilt substantially about the lowermost corner of the upper blade 19, as the left hand end of the ram is raised.

The second of the aforementioned solenoid operated valves is connected in a line 279 which extends between the connecting line 53 and the line leading from the "up" valve 59 to the cylinder assembly 33. This creates a flow path for the liquid in addition to a possible flow path through the foot valve 57 to tank 47. A check valve 281 in this solenoid valve connection 279 precludes flow through this line 279 in the reverse direction.

With the foot valve 57 in open condition, and with flow through the connecting line 53 blocked, as by closure of the solenoid valve 265, the operating dump valve 61 and the "down" valve 51, hydraulic fluid pumped through the "up" valve 59, will divide, part of the fluid passing through the foot valve 57 and check valve 58 back to tank, while the remaining portion of the liquid will flow through the solenoid controlled valve 271 and check valve 281 to the upper end of the cylinder assembly 33. By reason of the fact that the upper surface area of the piston in the cylinder assembly 33, exceeds that of the lower surface of the piston, a differential pressure will be created, thereby driving the piston downward and causing the ram to pivot on the ball and socket connection at the right hand end of the ram, which as previously pointed out, constitutes an angular adjustment of the ram substantially about the lowermost corner of the shear blade. With such downward movement of the left hand end of the ram, a reduction in the rake angle of the blade will occur.

Whether the rake angle increases or decreases depends upon which of the two micro-switches 127 or 129 is actuated and this in turn, becomes a function of the direction in which the rake angle adjusting hand wheel 155 is rotated. As a preliminary to effecting such adjusting, however, it becomes necessary to pre-establish the hydraulic circuits which control movement of the ram.

For this purpose, I incorporate into the system a push button 285 and associated control circuit which serves to control energization of the first control relay 201. This push button energization circuit extends from the main lead 195 through the first control relay 201, the control push button 285 and the emergency stop limit switches 181, 183 to the other main lead 193.

Upon energization of this first control relay 201, a pair of normally open contacts 287 associated therewith are closed to complete a circuit from the main lead 193 directly through the solenoid of the down valve 51 to close such valve.

An additional pair of normally open contacts 289 is likewise closed to complete a circuit from the main lead 193 directly through the solenoid 215 of the operating dump valve 61 to close this valve.

The foot valve 57, being a normally open valve, does not have its controlling solenoid energized when the rake angle control push button 285 is depressed, and accordingly, this valve remains open.

Thus, to effect an adjustment of the rake angle, the rake angle control push button 285 is first depressed and held so while the control adjustment hand wheel 155 is rotated in one direction or the other, depending upon whether the rake angle is to be increased or decreased. Such adjustment is made at a rate commensurate with the resulting angular shifting of the ram, until the indicator or pointer 167 indicates that the proper angle has been reached. Too rapid a rate of adjustment of the adjusting mechanism, is apt to cause a resulting swing in the actuating bar 137 sufficient to open one or the other of the emergency switches 181, 183 to thereby shut down the machine and necessitate closing of the reset button 257, to again bring the machine back into operation.

From the foregoing description of my invention in its preferred form, it will be apparent that the same fulfills all the objects attributed thereto, and while I have disclosed the preferred form of my invention in considerable detail and as embodied in a shear machine, the features of the invention are broadly applicable to other machines involving a ram. Accordingly, I do not desire to be limited in my protection to such details as I have illustrated and described, except as may be necessitated by the appended claims.

I claim:

1. A shear machine, comprising a frame, a ram slidably mounted on said frame and having a shear blade angularly affixed thereto; drive means for said ram, said drive means including a cylinder assembly supported by said frame and having a drive connection to said ram at one end thereof, a second cylinder assembly supported by said frame and having a drive connection to the opposite end of said ram, a source of hydraulic liquid, a main pump, and a hydraulic system including said pump, said liquid source and said cylinder assemblies; a table upon which to place work to be operated on; work hold down means including a fixed beam extending across said machine in front of said ram, and a plurality of hold down devices depending from said fixed beam toward said table; and means for urging said hold down devices into contact with work on said table prior to actuating said ram toward said work, said means including a main pump supply line from said main pump to said hold down devices, a hold down advance valve in said line, an auxiliary pump in a line leading from a liquid supply source to the main pump supply line to said hold down devices and connecting therewith at a point between said hold down advance valve and said hold down devices, means for maintaining said hold down advance valve open while blocking flow of liquid to said cylinder assemblies, to drive said hold down devices toward such work while said ram remains stationary, and time delay means for subsequently closing said hold down advance valve and unblocking flow to said cylinder assemblies for a down stroke of said ram, whereby said auxiliary pump applies pressure to said hold down devices while said main pump drives said ram.

2. A shear machine, comprising a frame, a ram slidably mounted on said frame and having a shear blade angularly affixed thereto; drive means for said ram, said drive means including a cylinder assembly supported by said frame and having a drive connection to said ram at one end thereof, a second cylinder assembly supported by said frame and having a drive connection to the opposite end of said ram, a source of hydraulic liquid, a main pump, and a hydraulic system including said pump, said liquid source and said cylinder assemblies; a table upon which to place work to be operated on; work hold down means including a fixed beam extending across said machine in front of said ram, and a plurality of hold down devices depending from said fixed beam toward said table; and means for urging said hold down devices into contact with work on said table prior to actuating said ram toward said work, said means including a main pump supply line from said main pump to said hold down devices, a normally closed hold down advance valve in said line, an auxiliary pump in a line leading from a liquid supply source to the main pump supply line to said hold down devices and connecting therewith at a point between said hold down advance valve and said hold down devices, means for opening said hold down advance valve while blocking flow of liquid to said cylinder assemblies, to drive said hold down devices toward such work while said ram remains stationary, and time delay means for subsequently closing said hold down advance valve and unblocking flow to said cylinder assemblies for a down stroke of said ram, whereby said auxiliary pump applies pressure to said hold down devices while said main pump drives said ram.

3. A shear machine, comprising a frame, a ram slidably mounted on said frame and having a shear blade angularly affixed thereto; drive means for said ram, said drive means including a cylinder assembly supported by said frame and having a drive connection to said ram at one end thereof, a second cylinder assembly supported by said frame and having a drive connection to the opposite end of said ram, a source of hydraulic liquid, a main pump, and a hydraulic system including said pump, said liquid source and said cylinder assemblies; a table upon which to place work to be operated on; work hold down means including a fixed beam extending across said machine in front of said ram, and a plurality of hold down devices depending from said fixed beam toward said table; and means for urging said hold down devices into contact with work on said table prior to actuating said ram toward said work, said means including a main pump supply line from said main pump to said hold down devices, a solenoid operated normally closed hold down advance valve in said line, an auxiliary pump in a line leading from said liquid supply source to the main pump supply line to said hold down devices and connecting therewith at a point between said hold down advance valve and said hold down devices, means for opening said hold down advance valve while blocking flow of liquid to said cylinder assemblies, to drive said hold down devices toward such work while said ram remains stationary, and time delay means for subsequently closing said hold down advance valve and unblocking flow to said cylinder assemblies for a down stroke of said ram, whereby said auxiliary pump applies pressure to said hold down devices while said main pump drives said ram.

4. A shear machine, comprising a frame, a ram slidably mounted on said frame and having a shear blade angularly affixed thereto; drive means for said ram, said drive means including a cylinder assembly supported by said frame and having a drive connection to said ram at one end thereof, a second cylinder assembly supported by said frame and having a drive connection to the opposite end of said ram, a source of hydraulic liquid, a main pump, and a hydraulic system including said pump, said liquid source and said cylinder assemblies; a table upon which to place work to be operated on; work hold down means including a fixed beam extending across said machine in front of said ram, a plurality of hold down devices depending from said fixed beam toward said table, each hold down device including a cylinder affixed to said beam and having a flow connection to the upper end of the cylinder, a piston in said cylinder, and a spring supporting said piston in said cylinder; and means for urging said hold down pistons into contact with work on said table prior to actuating said ram toward said work, said means including a main pump supply line from said main pump to said hold down devices, a solenoid operated normally closed hold down advance valve in said line, an auxiliary pump in a line leading from said liquid supply source to the main pump supply line to said hold down devices and connecting therewith at a point between said hold down advance valve and said hold down devices, means for opening said hold down advance valve while blocking flow of liquid to said cylinder assemblies, to drive said hold down pistons toward such work while said ram remains stationary, and time delay means for subsequently closing said hold down advance valve and unblocking flow to said cylinder assemblies for a down stroke of said ram, whereby said auxiliary pump applies pressure to said hold down devices while said main pump drive said ram.

References Cited in the file of this patent

UNITED STATES PATENTS

| | | |
|---|---|---|
| 2,278,713 | Riddle | Apr. 7, 1942 |
| 2,400,996 | Iverson | May 28, 1946 |
| 2,659,204 | Conway et al. | Nov. 17, 1953 |
| 2,667,922 | Hill et al. | Feb. 2, 1954 |

FOREIGN PATENTS

| | | |
|---|---|---|
| 1,137,783 | France | Jan. 21, 1957 |